United States Patent
Lu et al.

(10) Patent No.: US 10,826,629 B1
(45) Date of Patent: Nov. 3, 2020

(54) METHOD AND APPARATUS FOR GENERATING HUMAN POSE IMAGES BASED ON WI-FI SIGNALS

(71) Applicant: Beijing University of Posts and Telecommunications, Beijing (CN)

(72) Inventors: Zhaoming Lu, Beijing (CN); Lingchao Guo, Beijing (CN); Xiangming Wen, Beijing (CN); Shuang Zhou, Beijing (CN); Zijun Han, Beijing (CN); Xinbin Shen, Beijing (CN); Zhihong He, Beijing (CN)

(73) Assignee: Beijing University of Posts and Telecommunications, Sammamish (CN)

( * ) Notice: Subject to any disclaimer, the term of this patent is extended or adjusted under 35 U.S.C. 154(b) by 0 days.

(21) Appl. No.: 16/599,041

(22) Filed: Oct. 10, 2019

(30) Foreign Application Priority Data

Aug. 7, 2019 (CN) .......................... 2019 1 07270451

(51) Int. Cl.
*G06K 9/62* (2006.01)
*H04B 17/30* (2015.01)
*G01B 15/00* (2006.01)

(52) U.S. Cl.
CPC ................... *H04B 17/30* (2015.01)

(58) Field of Classification Search
CPC . G06K 9/00369; G06K 9/00348; H04B 17/30
USPC ....................................................... 455/67.11
See application file for complete search history.

(56) References Cited

U.S. PATENT DOCUMENTS

| | | | |
|---|---|---|---|
| 2018/0249506 A1* | 8/2018 | Amiri | H04L 5/0023 |
| 2019/0028320 A1* | 1/2019 | Xu | H04W 72/0413 |
| 2019/0188533 A1* | 6/2019 | Katabi | G06K 9/00369 |

OTHER PUBLICATIONS

Wang et al, Can WiFi Estimate Person Pose?Apr. 2019, arX: 1904.00277v2 [cs.CV] Apr. 2, 2019; p. 1-9 (Year: 2019).*

* cited by examiner

*Primary Examiner* — Lee Nguyen
(74) *Attorney, Agent, or Firm* — Seed IP Law Group LLP

(57) ABSTRACT

Embodiment of the present disclosure discloses a method and an apparatus for generating human pose images based on Wi-Fi signals. The method for generating human pose images based on Wi-Fi signals comprises: receiving Wi-Fi signals through one or more antennas; obtaining channel state information from the Wi-Fi signals; extracting channel state information components related to human pose changes from the channel state information; constructing a mapping model between the Wi-Fi signals and the human poses to map the channel state information components related to the human pose changes to a human pose image sequence.

9 Claims, 4 Drawing Sheets

METHOD AND APPARATUS FOR GENERATING HUMAN POSE IMAGES BASED ON WI-FI SIGNALS

TECHNICAL FIELD

The present disclosure relates to the field of communication and computer technologies, and in particular, to a method and apparatus for generating human pose images based on Wi-Fi signals.

BACKGROUND

Human pose images generation is a process of extracting information of joints of human arms and legs, as well as key points of human trunk and head to generate two-dimensional human skeleton diagrams or contour images. It has a wide range of applications and plays an important role in the fields of national defense security, human-computer interaction, and smart home, etc. At present, the human pose images generation is mainly based on computer vision methods. Human pose images are collected by a camera, and position, direction and dimension information of each part of the human body are detected from the images by using computer vision methods. The methods are widely used and have many mature and highly accurate models. However, the camera is susceptible to light and cannot obtain the pose information of the human body through obstacles. Meanwhile, privacy leakage is also a remarkable problem.

In recent years, human sensing technology based on Wi-Fi signals has become a new and popular research direction. A basic principle of the human sensing technology based on the Wi-Fi signals is that because the Wi-Fi signals propagate through multiple paths from a transmitter to a receiver due to reflection, scattering and diffraction caused by objects or human bodies in a space, a received multipath superimposed signal carries information reflecting characteristics of the space. Channel State Information (CSI) can characterize multipath propagation of the signals, and multipath changes caused by human activities are included in the CSI changes.

In the course of proposing the present disclosure, the inventors found that multipath resolution provided by CSI is limited. The CSI contains all signal components that are related to the propagation space and the Wi-Fi signals are not visible. These deficiencies cause inability to label tag data, whereby greatly limiting sensing accuracy of the human sensing technology based on the Wi-Fi signals and causing it difficult to generate the human pose images based on the Wi-Fi signals.

SUMMARY

In order to at least partially solve the related technical problems, an embodiment of the present disclosure provides a method and apparatus for generating human pose images based on Wi-Fi signals.

An aspect of the present disclosure provides a method for generating human pose images based on Wi-Fi signals.

Specifically, the method for generating human pose images based on the Wi-Fi signals includes:

receiving the Wi-Fi signals through one or more antennas;

obtaining channel state information from the Wi-Fi signals;

extracting channel state information components related to human pose changes from the channel state information;

constructing a mapping model between the Wi-Fi signals and the human poses to map the channel state information components related to the human pose changes to a human pose image sequence.

Optionally, the Wi-Fi signals are received in a way of:

expanding the bandwidth of the Wi-Fi signals; and/or receiving, by a plurality of cooperative receiving devices, the Wi-Fi signals sent by one or more transmitting devices; and/or receiving, by a plurality of receiving antennas, the Wi-Fi signals transmitted by a plurality of transmitting antennas.

Optionally, the expanding the bandwidth of the Wi-Fi signals includes fast switching between adjacent Wi-Fi channels; and/or the cooperation between the one or more transmitting devices and the plurality of receiving device is implemented in the following manner: the one or more transmitting devices and the plurality of receiving devices switch the Wi-Fi channels synchronously; and/or directions from respective receiving devices to a specific one of the one or more transmitting devices are orthogonal; and/or the plurality of receiving devices receive the Wi-Fi signals synchronously and extract the channel state information from the Wi-Fi signals.

Optionally, the obtaining the channel state information from the Wi-Fi signals comprises:

obtaining respective channel state information of adjacent Wi-Fi channels from the Wi-Fi signals transmitted on the adjacent Wi-Fi channels;

performing interpolation, amplitude and phase correction, and splicing on the respective channel state information of the adjacent Wi-Fi channels to obtain the channel state information.

Optionally, the obtaining the respective channel state information of the adjacent Wi-Fi channels comprises obtaining amplitude and phase information of the respective channel state information of the adjacent Wi-Fi channels of all transmit-receive antenna pairs;

the splicing the respective channel state information of the adjacent Wi-Fi channels includes splicing the respective channel state information of the adjacent Wi-Fi channels of each transmit-receive antenna pair separately.

Optionally, the extracting the channel state information components related to the human pose changes from the channel state information comprises:

selecting a transmit-receive antenna pair having the largest amplitude variance of the channel state information as a reference antenna pair;

extracting amplitude and dynamic phase of the channel state information of the reference antenna pair as the channel state information components related to the human pose change.

Optionally, the mapping the channel state information components related to the human pose changes to the human pose image sequence comprises:

extracting the human pose image sequence from a video stream synchronized with the Wi-Fi signals using a computer vision method;

establishing the mapping model between the channel state information components related to the human pose changes and the human pose image sequence.

Optionally, the computer vision method includes any one of the following: OpenPose, DensePose, Realtime Multi-Person Estimation, AlphaPose, MPII Human Pose, DeepPose.

Optionally, the establishing the mapping model between the channel state information components related to the human pose changes and the human pose image sequence comprises:

filtering the channel state information components related to the human pose changes with a filter;

normalizing the human pose image sequence by standardization;

using the filtered channel state information components related to the human pose changes and the standard normalized human pose image sequence to train a neural network, to obtain the mapping model between the Wi-Fi signals and the human poses.

Another aspect of the present disclosure provides a human pose images generating apparatus based on Wi-Fi signals, comprising:

a channel state information obtaining module configured to receive Wi-Fi signals through antennas and to obtain channel state information from the Wi-Fi signals;

a human poses related components extracting module configured to extract channel state information components related to human pose changes from the channel state information;

a model mapping module configured to construct a mapping model between the Wi-Fi signals and the human poses, and to map the channel state information components related to the human pose changes to a human pose image sequence.

Optionally, the Wi-Fi signals are received in a way of:

expanding a bandwidth of the Wi-Fi signals; and/or receiving, by a plurality of cooperative receiving devices, the Wi-Fi signals sent by one or more transmitting devices; and/or receiving, by a plurality of receiving antennas, the Wi-Fi signals transmitted by a plurality of transmitting antennas.

Optionally, the expanding the bandwidth of the Wi-Fi signals includes fast switching between adjacent Wi-Fi channels; and/or the cooperation between the one or more transmitting devices and the plurality of receiving device is implemented in the following manner: the one or more transmitting devices and the plurality of receiving devices switch the Wi-Fi channels synchronously; and/or directions from respective receiving devices to a specific one of the one or more transmitting devices are orthogonal; and/or the plurality of receiving devices receive the Wi-Fi signals synchronously and extract the channel state information from the Wi-Fi signals.

Optionally, the obtaining the channel state information from the Wi-Fi signals comprises:

obtaining respective channel state information of adjacent Wi-Fi channels from the Wi-Fi signals transmitted on the adjacent Wi-Fi channels;

performing interpolation, amplitude and phase correction, and splicing on the respective channel state information of the adjacent Wi-Fi channels to obtain the channel state information.

Optionally, the obtaining the respective channel state information of the adjacent Wi-Fi channels comprises obtaining amplitude and phase information of the respective channel state information of the adjacent Wi-Fi channels of all transmit-receive antenna pairs;

the splicing the respective channel state information of the adjacent Wi-Fi channels includes splicing the respective channel state information of the adjacent Wi-Fi channels of each transmit-receive antenna pair separately.

Optionally, the extracting the channel state information components related to the human pose changes from the channel state information comprises:

selecting a transmit-receive antenna pair having the largest amplitude variance of the channel state information as a reference antenna pair;

extracting amplitude and dynamic phase of the channel state information of the reference antenna pair as the channel state information components related to the human pose changes.

Optionally, the mapping the channel state information components related to the human pose changes to the human pose image sequence comprises:

extracting the human pose image sequence from a video stream synchronized with the Wi-Fi signals using a computer vision method;

establishing the mapping model between the channel state information components related to the human pose changes and the human pose image sequence.

Optionally, the computer vision method includes any one of the following: OpenPose, DensePose, Realtime Multi-Person Estimation, AlphaPose, MPII Human Pose, DeepPose.

Optionally, the establishing the mapping model between the channel state information components related to the human pose changes and the human pose image sequence comprises:

filtering the channel state information components related to the human pose changes with a filter;

normalizing the human pose image sequence by standardization;

using the filtered channel state information components related to the human pose changes and the standard normalized human pose image sequence to train a neural network, to obtain the mapping model between the Wi-Fi signals and the human poses.

BRIEF DESCRIPTION OF THE DRAWINGS

Other objects and advantages of the present disclosure will become more apparent from the detailed description of the unlimited implementation with reference to the drawings. In the drawings.

DETAILED DESCRIPTION

Figure 1:
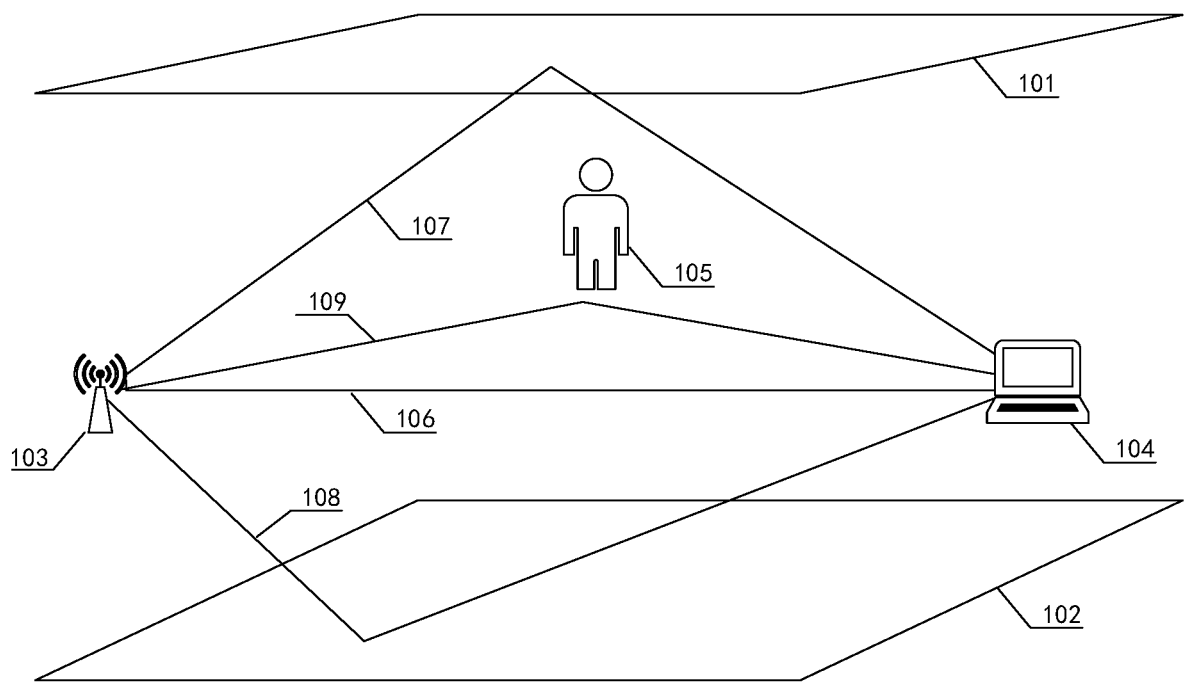
FIG. 1 shows a schematic diagram of an application scenario according to an embodiment of the present disclosure.

Hereinafter, exemplary embodiments of the present disclosure will be described in details with reference to the accompanying drawings so that those of ordinary skilled in the art can easily implement these embodiments. Further, portions that are not related to the description of the exemplary embodiments are omitted in the drawings for the sake of clarity.

In the present disclosure, it is to be understood that the terms such as "comprising", "including" or "having" are intended to indicate the presence of features, numbers, steps, acts, components, parts or combinations thereof. The possibility of the presence or addition of a plurality of other features, numbers, steps, acts, components, parts or combinations thereof is not excluded.

It should also be noted that the embodiments of the present disclosure and the features of the embodiments may be combined with each other without conflict. Next, the present disclosure will be described in details with reference to the drawings and embodiments.

In the course of proposing the present disclosure, the inventors have found that multipath resolution provided by CSI is limited. The CSI contains all signal components that are related to the propagation space and the Wi-Fi signals are not visible. These deficiencies cause inability to label tag data, whereby greatly limiting sensing accuracy of the human sensing technology based on the Wi-Fi signals and causing it difficult to generate the human pose images based on the Wi-Fi signals.

FIG. 1 shows a schematic diagram of an application scenario according to an embodiment of the present disclosure. It can be understood that the application scenario shown in FIG. 1 is only for explaining the concepts and principles of the present disclosure, and does not mean that the present disclosure is only applicable to such an application scenario.

As shown in FIG. 1, the application scenario includes:

A ceiling 101, a floor 102, a Wi-Fi signals transmitting device 103, a Wi-Fi signals receiving device 104, and a human body 105 that are disposed between the ceiling 101 and the floor 102.

Signals transmitted by the Wi-Fi signal transmitting device 103 can reach the Wi-Fi signal receiving device 104 through a line of sight (LOS) path 106, a ceiling reflection path 107, a floor reflection path 108, and a human body reflection path 109.

A signal component transmitted through the human body reflection path 109 can reflect changes of the human pose and is called a dynamic signal component. Signal components transmitted through the other paths 106 to 108 are called static signal components. According to an embodiment of the present disclosure, in addition to the paths 106 to 108, signals reflected by fixed furnishings such as tables and chairs are also referred to as the static signal components. These static signal components need to be filtered out during signal processing.

The Wi-Fi signal receiving device 104 obtains channel state information of the signal components of all these paths, extracts channel state information components related to the human pose changes therefrom, and constructs a mapping model between the Wi-Fi signals and the human poses.

A human pose change velocity vector can be decomposed into a vertical component which is vertical to a direction from the Wi-Fi signal transmitting device to the Wi-Fi signal receiving device, and a parallel component which is parallel to the direction from the Wi-Fi signal transmitting device to the Wi-Fi signal receiving device. A signal analysis process of the Wi-Fi signal receiving device is sensitive to the vertical component and insensitive to the parallel component. Therefore, a plurality of Wi-Fi signal receiving devices can be used to sensitively perceive and analyze the human pose changes in an arbitrary direction.

Figure 2:
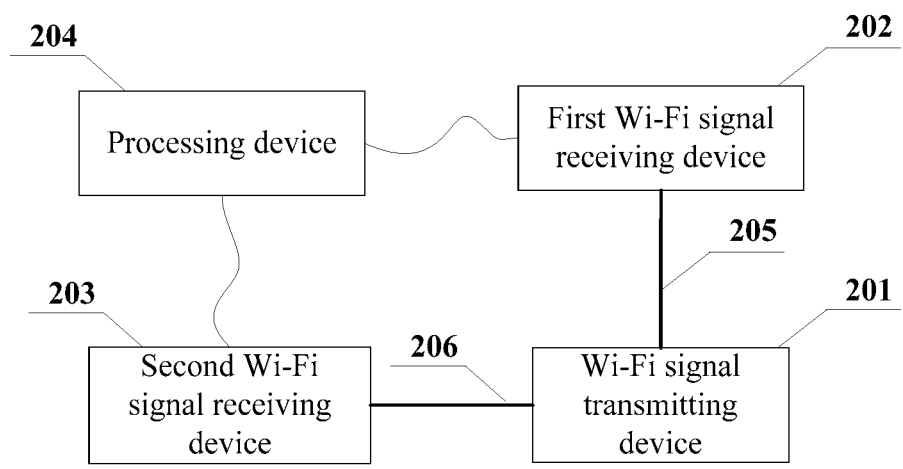
FIG. 2 shows a schematic diagram of a device arrangement according to an embodiment of the present disclosure.

FIG. 2 shows a schematic diagram of a device arrangement according to an embodiment of the present disclosure.

The device arrangement shown in FIG. 2 includes:

a Wi-Fi signal transmitting device 201 configured to transmit Wi-Fi signals;

a first Wi-Fi signal receiving device 202 and a second Wi-Fi signal receiving device 203 configured to receive the Wi-Fi signals;

a processing device 204 configured to perform comprehensive processing on the received Wi-Fi signals.

The first Wi-Fi signal receiving device 202, the second Wi-Fi signal receiving device 203, and the processing device 204 in FIG. 2 correspond to the Wi-Fi signal receiving device 104 in FIG. 1.

A direction from the Wi-Fi signal transmitting device 201 to the first Wi-Fi signal receiving device 202 is referred to by a reference numeral 205, and a direction from the Wi-Fi signal transmitting device 201 to the second Wi-Fi signal receiving device 203 is referred to by a reference numeral 206.

The Wi-Fi signal transmitting device 201, the first Wi-Fi signal receiving device 202, and the second Wi-Fi signal receiving device 203 are arranged in such a way that the direction 205 and the direction 206 are orthogonal to each other, and two human pose changes analysis spaces are constructed with mutually orthogonal sensitive directions, in order to realize perception and analysis of the human pose changes in any direction.

Figure 3:
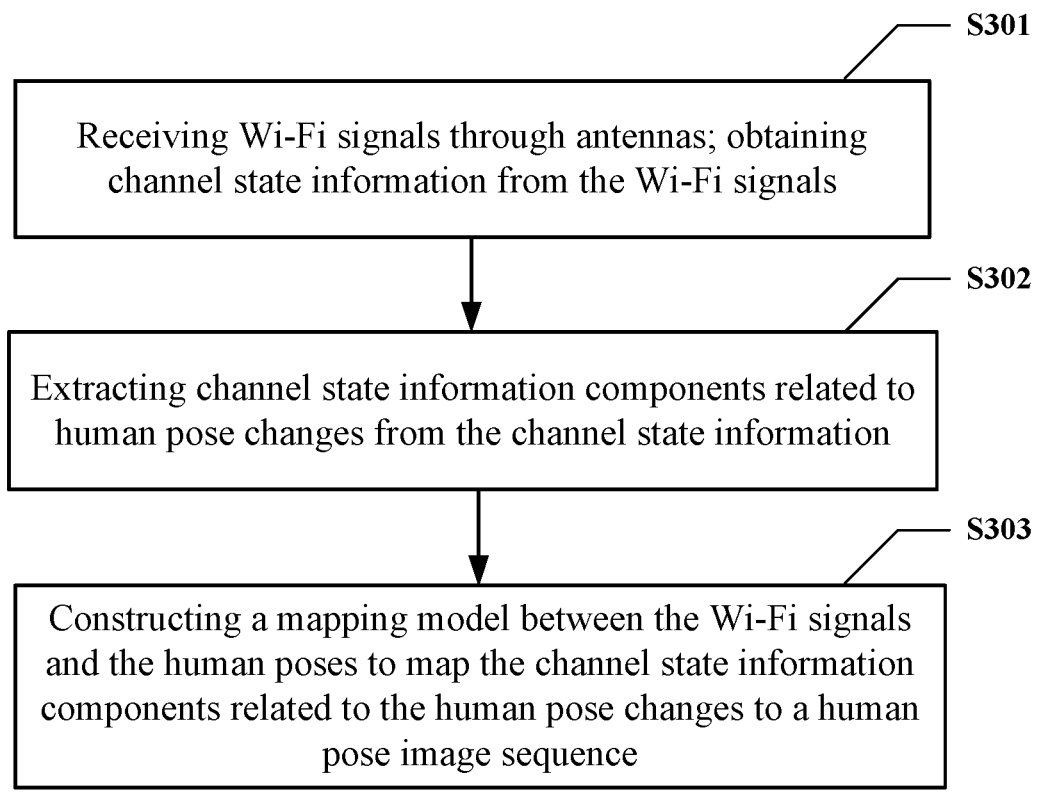
FIG. 3 shows a flowchart of a human pose images generation method based on Wi-Fi signals according to an embodiment of the present disclosure.

FIG. 3 shows a flowchart of a human pose images generation method based on Wi-Fi signals according to an embodiment of the present disclosure.

In step S301, the Wi-Fi signals are received through one or more antennas and channel state information is obtained from the Wi-Fi signals.

In step S302, channel state information components related to human pose changes are extracted from the channel state information.

In step S303, a mapping model between the Wi-Fi signals and the human poses is constructed to map the channel state information components related to the human pose changes to a human pose image sequence.

For example, the Wi-Fi signals are received through receiving antennas of the Wi-Fi signal receiving device, and channel state information is obtained from the Wi-Fi signals. The channel state information (CSI) can reflect characteristics of human or object motion, and in particular reflect the changes in human poses that occur in the physical space between the transmitting device and the receiving device of the Wi-Fi signals. As shown in FIG. 1, as the received Wi-Fi signals include both components reflected by the dynamic human body and components generated by reflection from the static ceiling, floor, tables, and the like, the channel state information includes the components related with the human pose changes and other channel state information components.

The channel state information components related to the human pose changes may be extracted from the channel state information and interference of the other components can be filtered out.

According to an embodiment of the present disclosure, techniques such as expanding bandwidth, multiple transceivers, multiple transmitting antennas, and multiple receiving antennas may also be used to improve multipath resolution.

A camera can be used to capture the human pose changes to generate a video stream synchronized with the Wi-Fi signals. A computer vision method can be used to extract a human body image sequence from the video stream synchronized with the Wi-Fi signals. A mapping model between the Wi-Fi signals and the human poses can be constructed by training a neural network to map the channel state information component related to the human pose changes into the human pose image sequence.

By adopting the above method, highly sensitive perception of the human pose changes based on the Wi-Fi signals can be realized, and high-quality human pose images can be generated.

According to an embodiment of the present disclosure, the Wi-Fi signals can be received in the way of: expanding the bandwidth of the Wi-Fi signals; and/or receiving, by a plurality of cooperative receiving devices, the Wi-Fi signals transmitted by one or more transmitting devices; and/or receiving, by a plurality of receiving antennas, the Wi-Fi signals transmitted by a plurality of transmitting antennas.

According to an embodiment of the present disclosure, the generating human pose images based on the Wi-Fi signals utilizes differences between arrival time of the signals components in the multiple paths to distinguish the difference in the human pose changes. To achieve accurate human pose images generation, multipath resolution of the Wi-Fi signals should be sufficiently high. Since the time resolution of the arrival time of the Wi-Fi multipath signal components (i.e., the multipath resolution) is limited by the bandwidth of the Wi-Fi signals, the resolution of the human pose changes is also affected by the signal bandwidth. The multipath resolution is proportional to the signal bandwidth, so extending the bandwidth can improve the multipath resolution, thereby improving the accuracy of the generation of the human pose images.

Perception and analysis of the human pose changes in an arbitrary direction can be realized by receiving, by a plurality of cooperative receiving devices, the Wi-Fi signals transmitted by a plurality of transmitting devices.

With multi-antenna technology, receiving the Wi-Fi signals with a plurality of receiving antennas transmitted by a plurality of transmitting antennas can fully utilize a spatial isolation effect of the plurality of transmitting antennas and the plurality of receiving antennas, so as to improve the multipath resolution and to obtain more channel state information.

According to an embodiment of the present disclosure, the expanding the bandwidth of the Wi-Fi signals includes fast switching between adjacent Wi-Fi channels; and/or the cooperation between the one or more transmitting devices and the plurality of receiving devices are implemented in the following manner: the one or more transmitting devices and the plurality of receiving devices switch the Wi-Fi channels synchronously; and/or directions from respective receiving devices to a specific one of the one or more transmitting devices are orthogonal; and/or the plurality of receiving devices receive the Wi-Fi signals synchronously and extract the channel state information from the Wi-Fi signals.

For example, when expanding the bandwidth, the Wi-Fi channels are quickly switched, and an acknowledgment and retransmission mechanism is used. After the transmitting device transmits a data packet, and the receiving device receives the data packet, the transmitting device and the receiving device simultaneously switch to a next Wi-Fi channel. Thereby, synchronous switching of the transmitting device and the receiving device is realized.

By making directions from respective receiving devices to a specific one of the one or more transmitting devices orthogonal, as shown in FIG. 2, two human pose changes analysis spaces whose sensitive directions are orthogonal to each other can be constructed, in order to realize the perception and analysis of the human pose changes in an arbitrary direction.

Different receiving devices receive the Wi-Fi signals synchronously and extract channel state information, which can be used to train neural networks.

Figure 4:
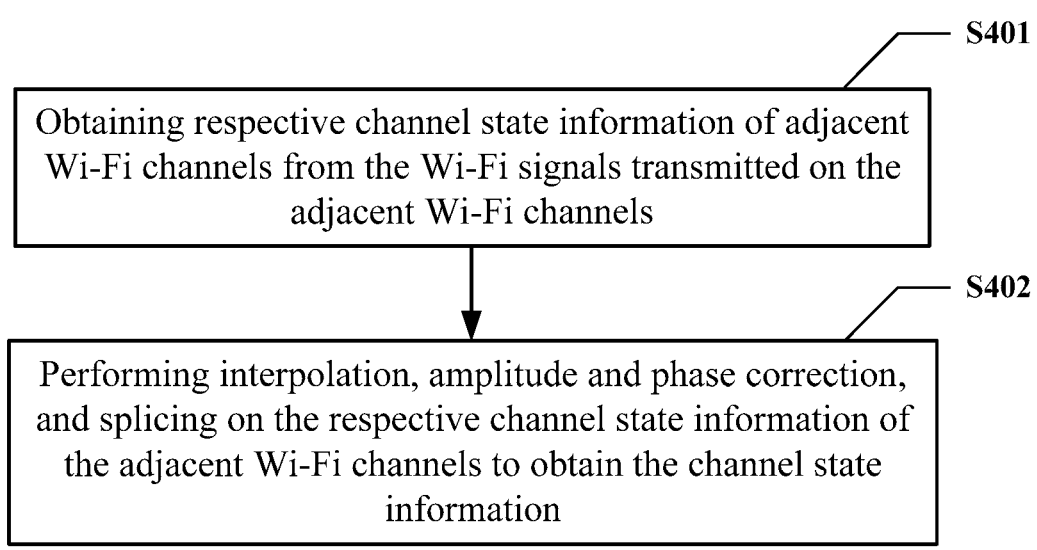
FIG. 4 shows a flowchart for obtaining the channel state information from the Wi-Fi signals according to an embodiment of the present disclosure.

FIG. 4 shows a flowchart for obtaining the channel state information from the Wi-Fi signals in step S301 of FIG. 3 according to an embodiment of the present disclosure.

In step S401, respective channel state information of adjacent Wi-Fi channels is obtained from the Wi-Fi signals transmitted on the adjacent Wi-Fi channels.

In step S402, interpolation, amplitude and phase correction, and splicing are performed on the respective channel state information of the adjacent Wi-Fi channels to obtain the channel state information.

According to an embodiment of the present disclosure, the obtaining the respective channel state information of the adjacent Wi-Fi channels includes: obtaining amplitude and phase information of respective channel state information of the adjacent Wi-Fi channels of all transmit-receive antenna pairs as the respective channel state information of the adjacent Wi-Fi channels. The splicing the respective channel state information of the adjacent Wi-Fi channels includes: splicing the respective channel state information of adjacent Wi-Fi channels of each of the transmit-receive antenna pairs.

For example, for all the transmit-receive antenna pairs, the respective channel state information of the adjacent Wi-Fi channels is obtained from the adjacent Wi-Fi channels and includes the amplitude information and the phase information.

The obtained respective channel state information of the adjacent Wi-Fi channels may be lost due to equipment out-of-step, object instantaneous occlusion, and the like. The respective channel state information of the adjacent Wi-Fi channels may be padded using interpolation, such as linear interpolation. In this process, the loss of the respective channel state information of adjacent Wi-Fi channels is determined by the timestamp of the data packet of the respective channel state information of the adjacent Wi-Fi channels, and the lost respective channel state information of adjacent Wi-Fi channels is complemented by linear interpolation.

Correction of the amplitude and phase of the respective channel state information of the adjacent Wi-Fi channels can be implemented by the following steps: after removing dynamic phase offset introduced by carrier frequency offset, the phase values of the subcarriers of the respective transmit-receive antenna pairs are processed with linear regression, and a slope of the phase values of each transmit-receive antenna pair is estimated. The slope value is then used to estimate a sampling frequency offset and a packet boundary detection error. The phase correction for each subcarrier of the respective transmit-receive antenna pairs is accomplished by subtracting a phase error caused by the sampling frequency offset and the packet boundary detection error from the phase value of the sub carrier.

For each transmit-receive antenna pair, the corrected amplitude information and phase information of the respective channel state information of the adjacent Wi-Fi channels are respectively spliced together to obtain the channel state information of a wider bandwidth of the transmit-receive antenna pair.

Figure 5:
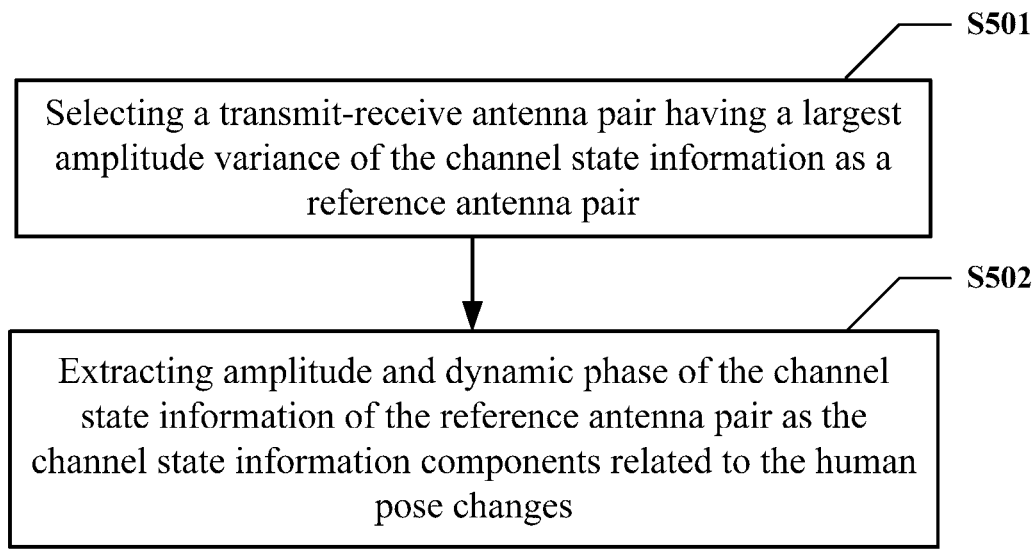
FIG. 5 shows a flowchart of extracting channel state information components related to human pose changes from the channel state information according to an embodiment of the present disclosure.

FIG. 5 shows a flowchart of extracting channel state information components related to human pose changes from the channel state information in step S302 of FIG. 3 according to an embodiment of the present disclosure.

In step S501, a transmit-receive antenna pair having a largest amplitude variance of the channel state information is selected as a reference antenna pair.

In step S502, amplitude and dynamic phase of the channel state information of the reference antenna pair are extracted as the channel state information components related to the human pose changes.

For all the transmit-receive antenna pairs, due to spatial isolation, the channel state information of some antenna pairs have obvious fluctuations, indicating that the quality of received signals is good, while the quality of the received signals of some antenna pairs is poor.

Based on statistical characteristics of the MIMO antenna information, the reference antenna pair is selected based on the channel state information of all the transmit-receive antenna pairs. In particular, the antenna pair with the largest variance of the channel state information, that is, with the most obvious fluctuation, is selected as the reference antenna pair.

Amplitude information of the reference antenna pair is extracted, and the dynamic phase information of the reference antenna pair is extracted with a conjugate multiplication algorithm.

In this step, the channel state information of the reference antenna pair is conjugately multiplicated with that of its adjacent antenna pair to eliminate random phase offset. Then, after subtracting a mean value to remove a static component, the dynamic phase information of the reference antenna pair is extracted. Finally, power adjustment is performed to amplify the dynamic phase information on the reference antenna.

Combining the amplitude information with the dynamic phase information, the channel state information component related to the human pose changes is obtained, and the influence of factors unrelated to the human pose changes is discarded, so that motion characteristics of the human can be clearer.

Figure 6:
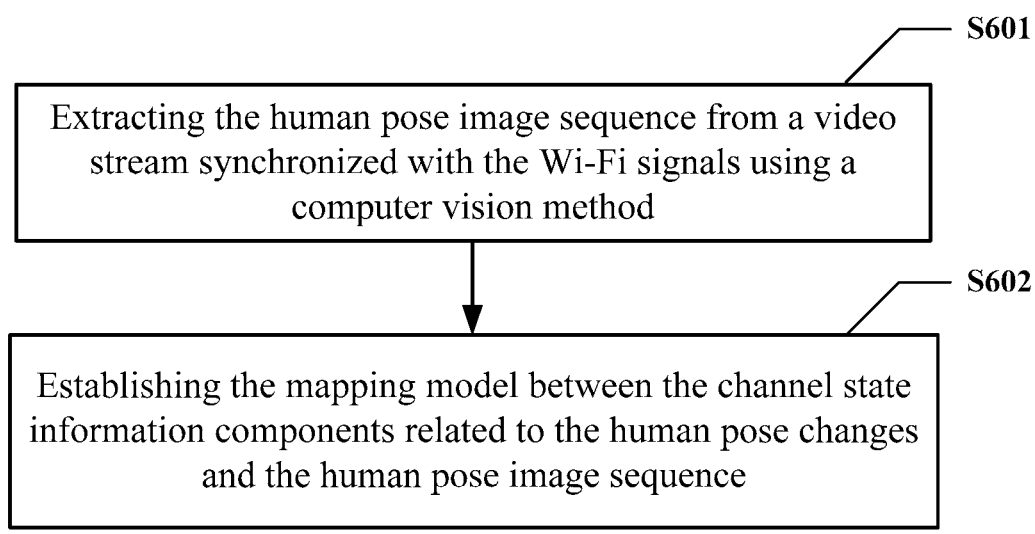
FIG. 6 shows a flowchart of mapping the channel state information components related to the human pose changes to a human pose image sequence according to an embodiment of the present disclosure.

FIG. 6 shows a flowchart of mapping the channel state information components related to the human pose changes to a human pose image sequence in step S303 of FIG. 3 according to an embodiment of the present disclosure.

In step S601, the human pose image sequence is extracted from a video stream synchronized with the Wi-Fi signals using a computer vision method.

In step S602, the mapping model between the channel state information components related to the human pose changes and the human pose image sequence is established.

According to an embodiment of the present disclosure, the human pose changes are captured using a camera to generated a video stream synchronized with the Wi-Fi signals, and the human pose image sequence is extracted from the video stream synchronized with the Wi-Fi signals using the computer vision method.

According to an embodiment of the present disclosure, the computer vision method includes any one of the following: OpenPose, DensePose, Realtime Multi-Person Estimation, AlphaPose, MPII Human Pose, and DeepPose.

Other computer vision methods may also be employed according to embodiments of the present disclosure.

Figure 7:
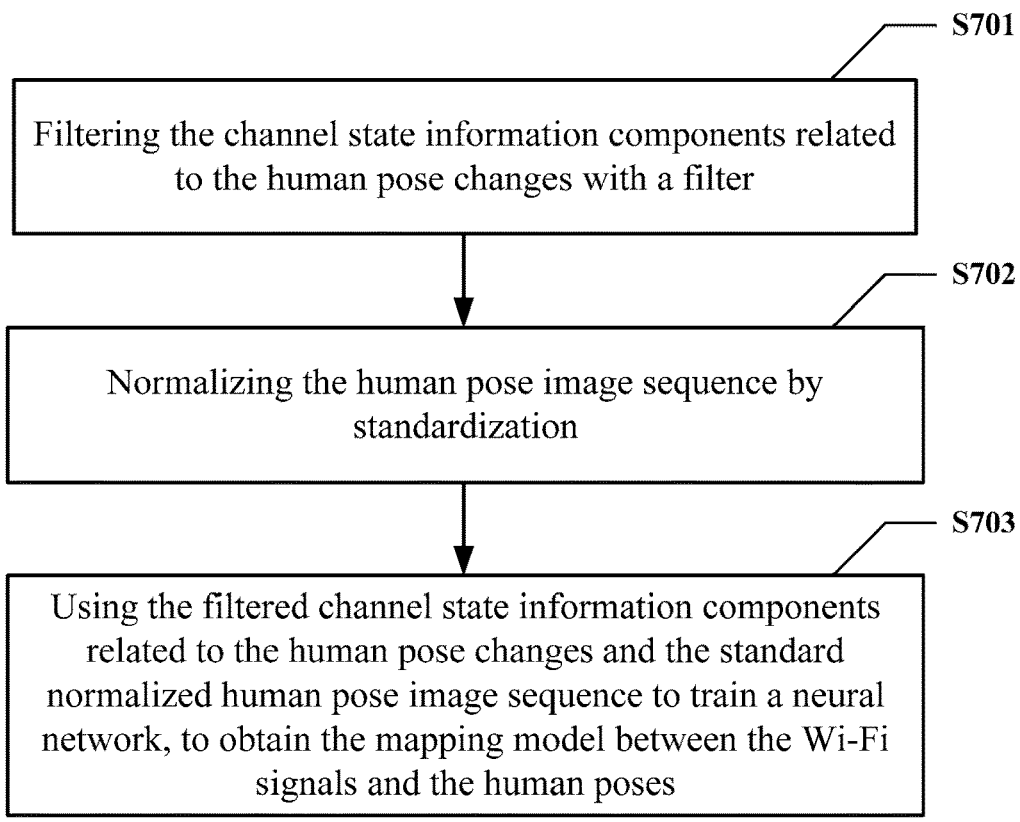
FIG. 7 shows a flowchart of establishing the mapping model between the channel state information component related to the human pose changes and the human pose image sequence according to an embodiment of the present disclosure.

FIG. 7 shows a flowchart of establishing the mapping model between the channel state information component related to the human pose changes and the human pose image sequence in step S602 of FIG. 6 according to an embodiment of the present disclosure.

In step S701, the channel state information components related to the human pose changes is filtered with a filter.

In step S702, the human pose image sequence is normalized by standardization.

In step S703, the filtered channel state information components related to the human pose changes and the standard normalized human pose image sequence are used to train a neural network, to obtain the mapping model between the Wi-Fi signals and the human poses.

According to an embodiment of the present disclosure, the amplitude information of the channel state information component related to the human pose changes is filtered by a filter, and the filter may be a discrete wavelet transform filter, a Butterworth filter, a principal component analysis filter, etc., or other filters.

Next, standard normalization is performed on the human pose image sequence. The human pose image sequence is a human body image sequence extracted from the video stream synchronized with the Wi-Fi signals.

Next, the filtered channel state information components related to the human pose changes are sent to the neural network as input of the neural network.

In this step, the channel state information components related to the human pose changes include the filtered amplitude information and the dynamic phase information. After standard normalization is performed on the channel state information components, according to a correspondence between the channel state information component sequence number and the human pose image sequence number, packet numbers of packets of the channel state information components and length information of one or more packets are sent to the neural network.

Next, feature extraction is performed on the input through an encoding network in the neural network.

In this step, the channel state information components related to the human pose changes are used as a picture, a packet length is used as a picture length, a number of subcarriers is used as a picture width, the amplitude information and the dynamic phase information are used as different layers, and the feature extraction is performed using a convolution neural network.

Next, the feature extraction result of the channel state information components related to the human pose changes is used for pose reconstruction by the decoding network in the neural network.

In this step, with the same step size and convolution kernel size as in the feature extraction step, the feature extraction result of the channel state information components related to the human pose change is used to reconstruct the human poses using a scale convolution network with the same layer as the convolution network to generate the human pose image sequence.

The reconstructed human poses are supervised by using the normalized human pose image sequence as labels.

The normalized human pose image sequence is used as labels, and the synchronization relationship between the human pose images and the input channel state information components related to the human pose changes is ensured according to the correspondence mapping relationship between the channel state information sequence number and the human pose image number. Cross entropy between the pose reconstruction result and the label is calculated, and the reconstructed human pose is supervised.

Finally, a human pose images generation model is obtained.

In this step, the neural network is trained and the human pose image sequence is used for supervision to construct the human pose images generation model. This model is a mapping between the Wi-Fi signals and the human skeleton or contour map.

The present disclosure utilizes the Wi-Fi signals for the human pose images generation to generate fine-grained and accurate images of human poses. The method utilizes the physical layer parameter channel state information of the Wi-Fi signals, and efficiently implements human pose images generation based on Wi-Fi by using a multi-path resolution improving mechanism, an extraction algorithm for the channel state information components related to the human pose changes, and the neural network trained under supervision of the human pose image sequence, etc.

Figure 8:
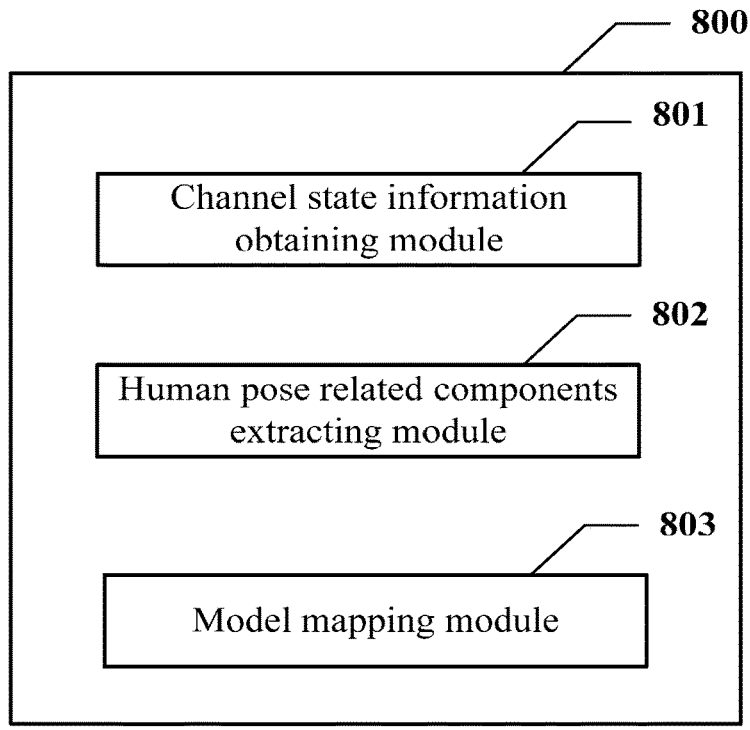
FIG. 8 shows a block diagram of a human pose images generating apparatus based on Wi-Fi signals according to an embodiment of the present disclosure.

FIG. 8 shows a block diagram of a human pose images generating apparatus based on Wi-Fi signals according to an embodiment of the present disclosure.

As shown in FIG. 8, the human pose images generating apparatus 800 based on Wi-Fi signals includes:

a channel state information obtaining module 801, configured to receive Wi-Fi signals through one or more antennas and to obtain channel state information from the Wi-Fi signals;

a human poses related components extracting module 802, configured to extract channel state information components related to human pose changes from the channel state information;

a model mapping module 803, configured to construct a mapping model between the Wi-Fi signals and the human poses, and to map the channel state information components related to the human pose changes to the human pose image sequence.

According to an embodiment of the present disclosure, the Wi-Fi signals are received in a way of: expanding the bandwidth of the Wi-Fi signals; and/or receiving, by a plurality of cooperative receiving devices, the Wi-Fi signals sent by one or more transmitting devices; and/or receiving, by a plurality of receiving antennas, the Wi-Fi signals transmitted by a plurality of transmitting antennas.

According to an embodiment of the present disclosure, the expanding the bandwidth of the Wi-Fi signals includes fast switching between adjacent Wi-Fi channels; and/or the cooperation between the one or more transmitting devices and the plurality of receiving device is implemented in the following manner: the one or more transmitting devices and the plurality of receiving devices switch the Wi-Fi channels synchronously; and/or directions from respective receiving devices to a specific one of the one or more transmitting devices are orthogonal; and/or the plurality of receiving devices receive the Wi-Fi signals synchronously and extract the channel state information from the Wi-Fi signals.

According to an embodiment of the present disclosure, the obtaining the channel state information from the Wi-Fi signals comprises: obtaining respective channel state information of adjacent Wi-Fi channels from the Wi-Fi signals transmitted on the adjacent Wi-Fi channels; performing interpolation, amplitude and phase correction, and splicing on the respective channel state information of the adjacent Wi-Fi channels to obtain the channel state information.

According to an embodiment of the present disclosure, the obtaining the respective channel state information of the adjacent Wi-Fi channels comprises obtaining amplitude and phase information of the respective channel state information of the adjacent Wi-Fi channels of all transmit-receive antenna pairs; the splicing the respective channel state information of the adjacent Wi-Fi channels includes splicing the respective channel state information of the adjacent Wi-Fi channels of each transmit-receive antenna pair separately.

According to an embodiment of the present disclosure, the extracting the channel state information components related to the human pose changes from the channel state information comprises: selecting a transmit-receive antenna pair having the largest amplitude variance of the channel state information as a reference antenna pair; extracting amplitude and dynamic phase of the channel state information of the reference antenna pair as the channel state information components related to the human pose changes.

According to an embodiment of the present disclosure, the mapping the channel state information components related to the human pose changes to the human pose image sequence comprises: extracting the human pose image sequence from a video stream synchronized with the Wi-Fi signals using a computer vision method; establishing the mapping model between the channel state information components related to the human pose changes and the human pose image sequence.

According to an embodiment of the present disclosure, the computer vision method includes any one of the following: OpenPose, DensePose, Realtime Multi-Person Estimation, AlphaPose, MPII Human Pose, DeepPose.

According to an embodiment of the present disclosure, the establishing the mapping model between the channel state information components related to the human pose changes and the human pose image sequence comprises: filtering the channel state information components related to the human pose changes with a filter; normalizing the human pose image sequence by standardization; using the filtered channel state information components related to the human pose changes and the standard normalized human pose image sequence to train a neural network, to obtain the mapping model between the Wi-Fi signals and the human poses.

The flowcharts and block diagrams in the drawings illustrate the architecture, functionality, and operation of possible implementations of systems, methods and computer program products in accordance with various embodiments of the present disclosure. In this regard, each block of the flowchart or block diagram can represent a module, a program segment, or a portion of code that comprises one or more of the executable instructions to implement predetermined logical functionality. It should also be noted that in some alternative implementations, the functions noted in the blocks may also occur in a different order than that illustrated in the drawings. For example, two successively represented blocks may in fact be executed substantially in parallel, and they may sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system that performs the specified function or operation, or can be implemented by a combination of dedicated hardware and computer instructions.

The units or modules described in the embodiments of the present disclosure may be implemented by software executed by one or more processors in a computer or by programmable hardware. The described units or modules may also be provided in a processor, the names of the units or modules do not in any way constitute a limitation of the unit or module itself.

In another aspect, the present disclosure further provides a computer readable storage medium, which may be a computer readable storage medium comprised in the apparatus in the above embodiment or may exist separately rather than a computer readable storage medium that is assembled into the device. The computer readable storage medium stores one or more programs that are used by one or more processors to perform the methods described in the present disclosure.

The above description is only a preferred embodiment herein and a description of the principles of the applied technology. It should be understood by those of ordinary skilled in the art that the scope of the disclosure referred to in the present disclosure is not limited to the specific combination of the above technical features, and should also be covered by the other technical solutions formed by any combination of their equivalent features with the above technical features without departing from the inventive concept. For example, the present disclosure covers technical solutions generated by replacing the above features with technical features having similar functions disclosed in but not limited to the present disclosure.

The invention claimed is:

1. A method for generating human pose images based on Wi-Fi signals, comprising:
   receiving Wi-Fi signals through one or more antennas;
   obtaining channel state information from the Wi-Fi signals;
   extracting channel state information components related to human pose changes from the channel state information;
   constructing a mapping model between the Wi-Fi signals and the human poses to map the channel state information components related to the human pose changes to a human pose image sequence,
   wherein the obtaining the channel state information from the Wi-Fi signals comprises:
      obtaining respective channel state information of adjacent Wi-Fi channels from the Wi-Fi signals transmitted on the adjacent Wi-Fi channels; and
      performing interpolation, amplitude and phase correction, and splicing on the respective channel state information of the adjacent Wi-Fi channels to obtain the channel state information.

2. The method according to claim 1, further comprising receiving the Wi-Fi signals in any one or any combination of the following manners:
   expanding the bandwidth of the Wi-Fi signals;
   receiving, by a plurality of cooperative receiving devices, the Wi-Fi signals sent by one or more transmitting devices; and
   receiving, by a plurality of receiving antennas, the Wi-Fi signals transmitted by a plurality of transmitting antennas.

3. The method according to claim 2, wherein:
   the expanding the bandwidth of the Wi-Fi signals includes fast switching between adjacent Wi-Fi channels; and/or
   the cooperation between the one or more transmitting devices and the plurality of receiving devices is implemented in any one or any combination of the following manners:
      The one or more transmitting devices and the plurality of receiving devices switch the Wi-Fi channels synchronously;
      directions from respective receiving devices to a specific one of the one or more transmitting devices are orthogonal;
      the plurality of receiving devices receive the Wi-Fi signals synchronously and extract the channel state information from the Wi-Fi signals.

4. The method according to claim 1, wherein:
   the obtaining the respective channel state information of the adjacent Wi-Fi channels comprises obtaining amplitude and phase information of the respective channel state information of the adjacent Wi-Fi channels of all transmit-receive antenna pairs;
   the splicing the respective channel state information of the adjacent Wi-Fi channels includes splicing the respective channel state information of the adjacent Wi-Fi channels of each transmit-receive antenna pair separately.

5. The method according to claim 4, wherein the extracting the channel state information components related to the human pose changes from the channel state information comprises:
   selecting a transmit-receive antenna pair having the largest amplitude variance of the channel state information as a reference antenna pair;
   extracting amplitude and dynamic phase of the channel state information of the reference antenna pair as the channel state information components related to the human pose changes.

6. The method according to claim 1, wherein the mapping the channel state information components related to the human pose changes to the human pose image sequence comprises:
   extracting the human pose image sequence from a video stream synchronized with the Wi-Fi signals using a computer vision method;
   establishing the mapping model between the channel state information components related to the human pose changes and the human pose image sequence.

7. The method according to claim 6, wherein the computer vision method includes any one of the following: OpenPose, DensePose, Realtime Multi-Person Estimation, AlphaPose, MPII Human Pose, DeepPose.

8. The method according to claim 6, wherein the establishing the mapping model between the channel state information components related to the human pose changes and the human pose image sequence comprises:
   filtering the channel state information components related to the human pose changes with a filter;
   normalizing the human pose image sequence by standardization;
   using the filtered channel state information components related to the human pose changes and the standard normalized human pose image sequence to train a neural network, to obtain the mapping model between the Wi-Fi signals and the human poses.

9. A human pose image generating apparatus based on Wi-Fi signals, comprising:
   a channel state information obtaining module configured to receive Wi-Fi signals through one or more antennas and to obtain channel state information from the Wi-Fi signals;

a human poses related components extracting module configured to extract channel state information components related to human pose changes from the channel state information;

a model mapping module configured to construct a mapping model between the Wi-Fi signals and the human poses, and to map the channel state information components related to the human pose changes to a human pose image sequence, wherein the obtaining the channel state information from the Wi-Fi signals comprises:

obtaining respective channel state information of adjacent Wi-Fi channels from the Wi-Fi signals transmitted on the adjacent Wi-Fi channels; and performing, interpolation, amplitude and phase correction, and splicing on the respective channel state information of the adjacent Wi-Fi channels to obtain the channel state information.

\* \* \* \* \*